(12) United States Patent
Kaplan

(10) Patent No.: US 10,481,343 B2
(45) Date of Patent: Nov. 19, 2019

(54) FIBER OPTIC DROP CABLE ASSEMBLY AND PRECONNECTORIZED CABLE ASSEMBLY

(71) Applicant: Steven E. Kaplan, Elyria, OH (US)

(72) Inventor: Steven E. Kaplan, Elyria, OH (US)

(*) Notice: Subject to any disclaimer, the term of this patent is extended or adjusted under 35 U.S.C. 154(b) by 0 days.

(21) Appl. No.: 16/384,329

(22) Filed: Apr. 15, 2019

(65) Prior Publication Data

US 2019/0278031 A1   Sep. 12, 2019

Related U.S. Application Data

(63) Continuation of application No. 15/944,433, filed on Apr. 3, 2018, now Pat. No. 10,261,265.

(60) Provisional application No. 62/491,366, filed on Apr. 28, 2017.

(51) Int. Cl.
*G02B 6/38* (2006.01)

(52) U.S. Cl.
CPC ......... *G02B 6/3857* (2013.01); *G02B 6/3858* (2013.01); *G02B 6/3887* (2013.01); *G02B 6/387* (2013.01); *G02B 6/3849* (2013.01); *G02B 6/3897* (2013.01)

(58) Field of Classification Search
None
See application file for complete search history.

(56) References Cited

U.S. PATENT DOCUMENTS

| 4,447,120 A | 5/1984 | Borsuk |
| 4,679,895 A | 7/1987 | Huber |
| 5,287,425 A | 2/1994 | Chang |
| 5,428,703 A | 6/1995 | Lee |
| 5,668,906 A | 9/1997 | Yamamura et al. |
| 7,090,406 B2 | 8/2006 | Melton et al. |
| 7,113,679 B2 | 9/2006 | Melton et al. |
| 8,885,998 B2 | 11/2014 | Marcouiller et al. |
| 8,931,963 B2 | 1/2015 | Scopic et al. |
| 2014/0241670 A1 | 8/2014 | Barnette, Jr. et al. |
| 2017/0176693 A1 | 6/2017 | Kaplan |

OTHER PUBLICATIONS

Fosco, "Fiber Optic Connector Tutorial, SC fiber optic connector basic structure", http://www.fiberoptics4sale.com/Merchant2/fiber-optic-connectors.php downloaded Dec. 14, 2015, pp. 1-14.

*Primary Examiner* — Jerry Rahll

(74) *Attorney, Agent, or Firm* — Fay Sharpe LLP

(57) ABSTRACT

A fiber optic cable assembly or termination system is preconnectorized and may include different combinations of collars, crimp bands, and clamp assemblies to improve functionality of the arrangement.

18 Claims, 11 Drawing Sheets

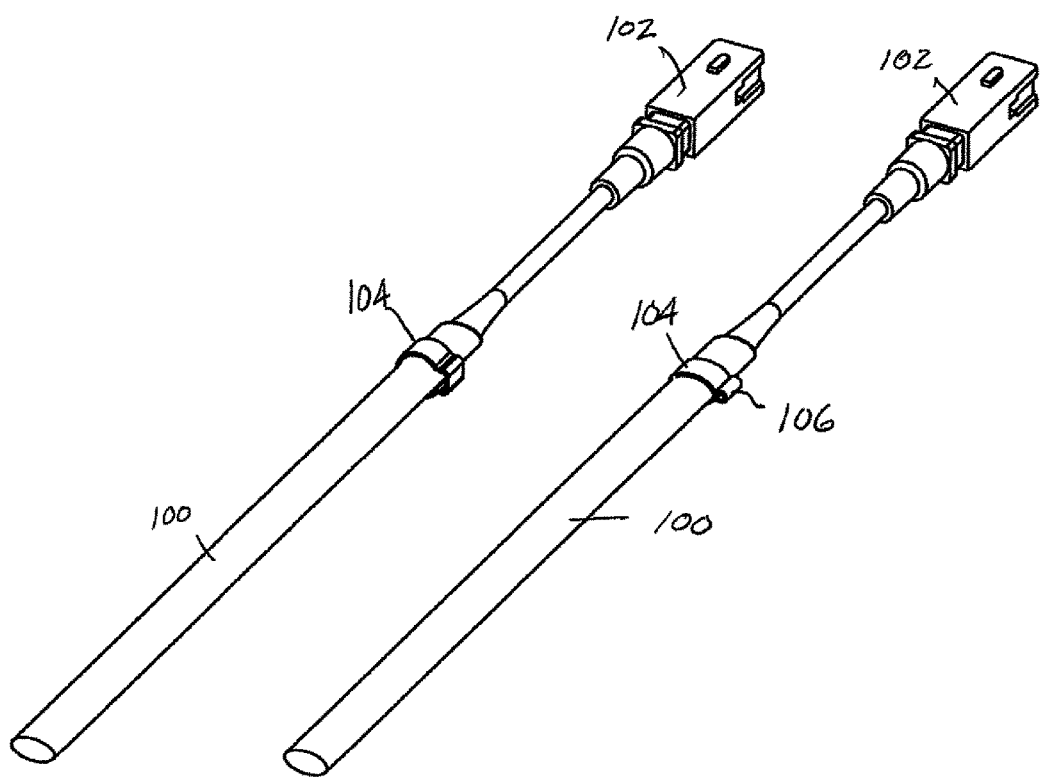

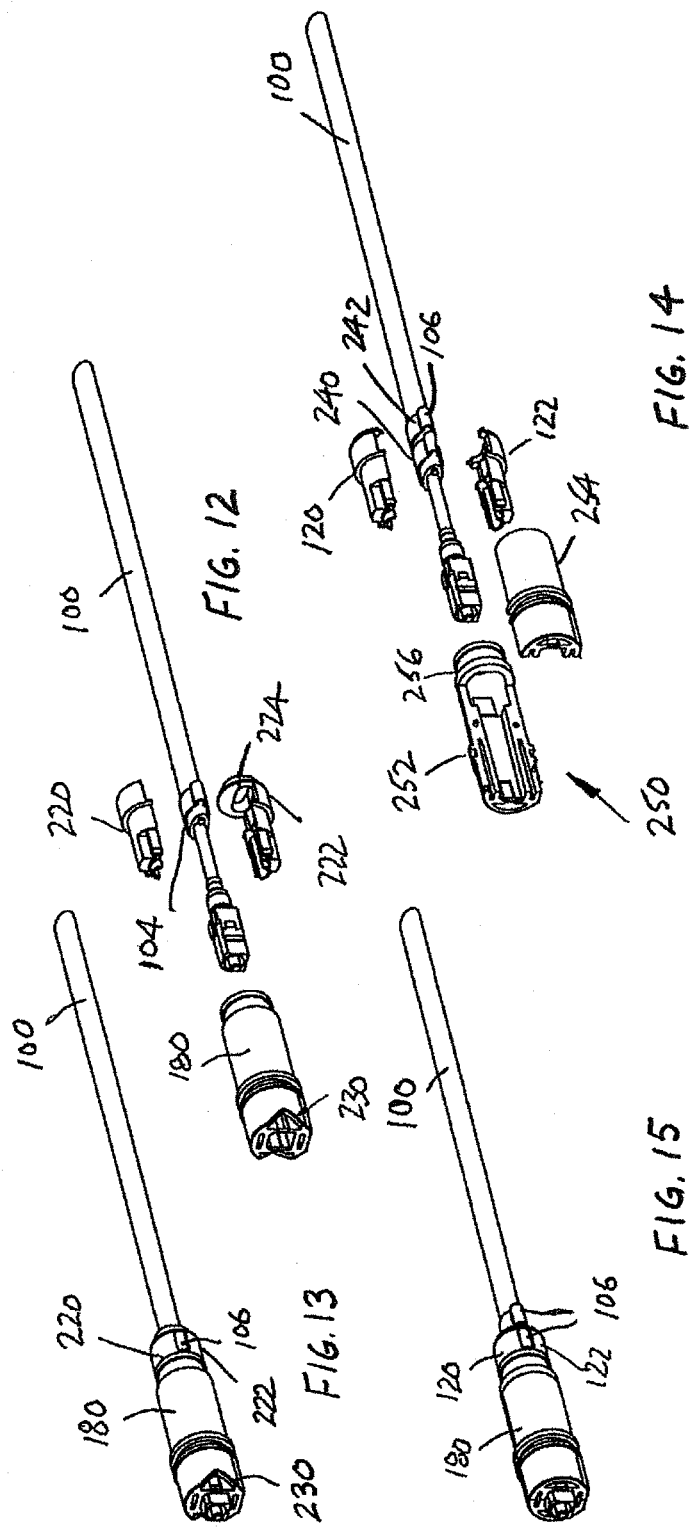

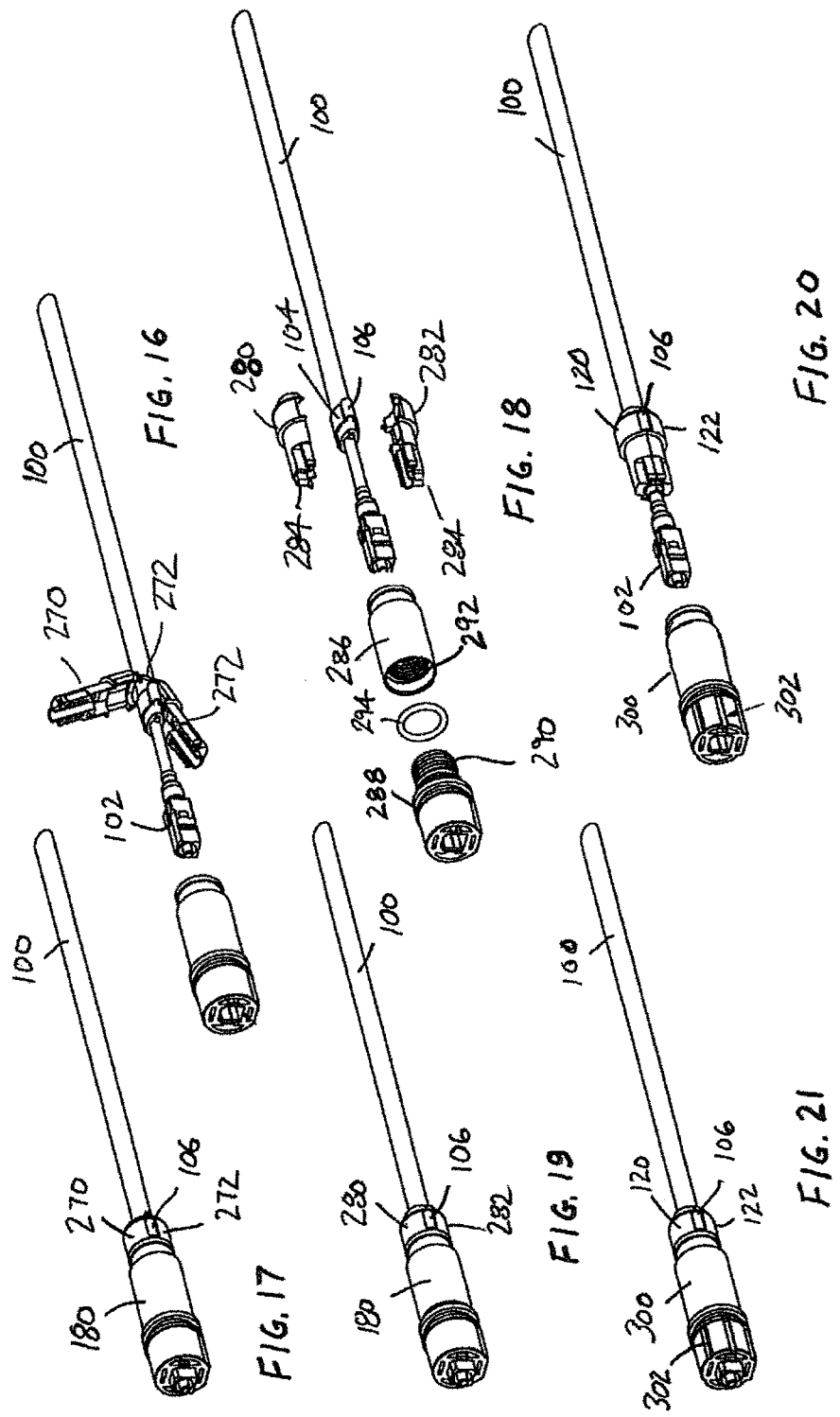

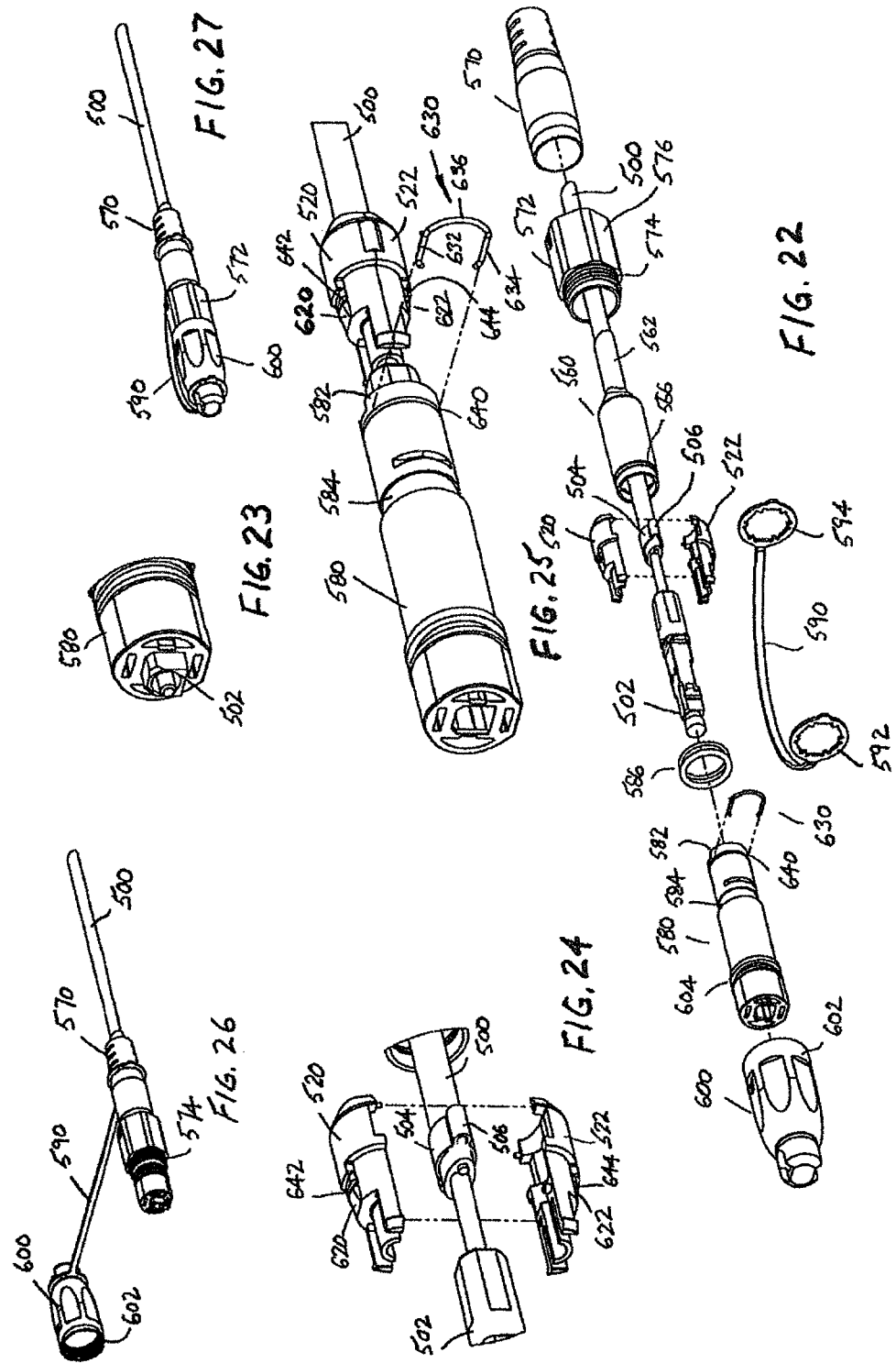

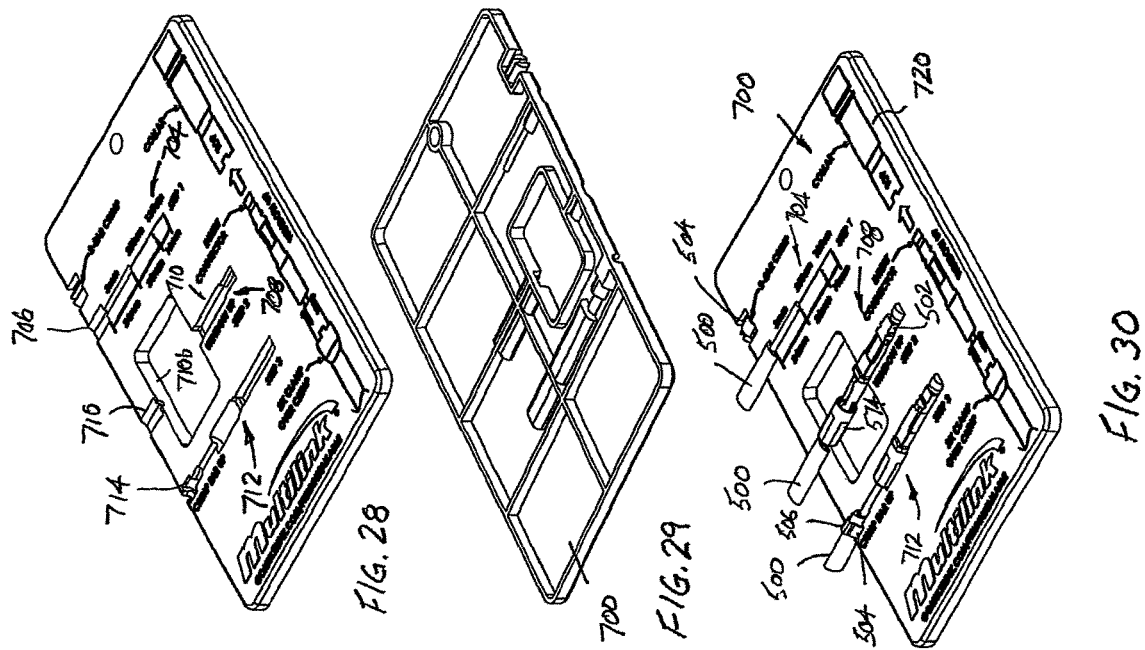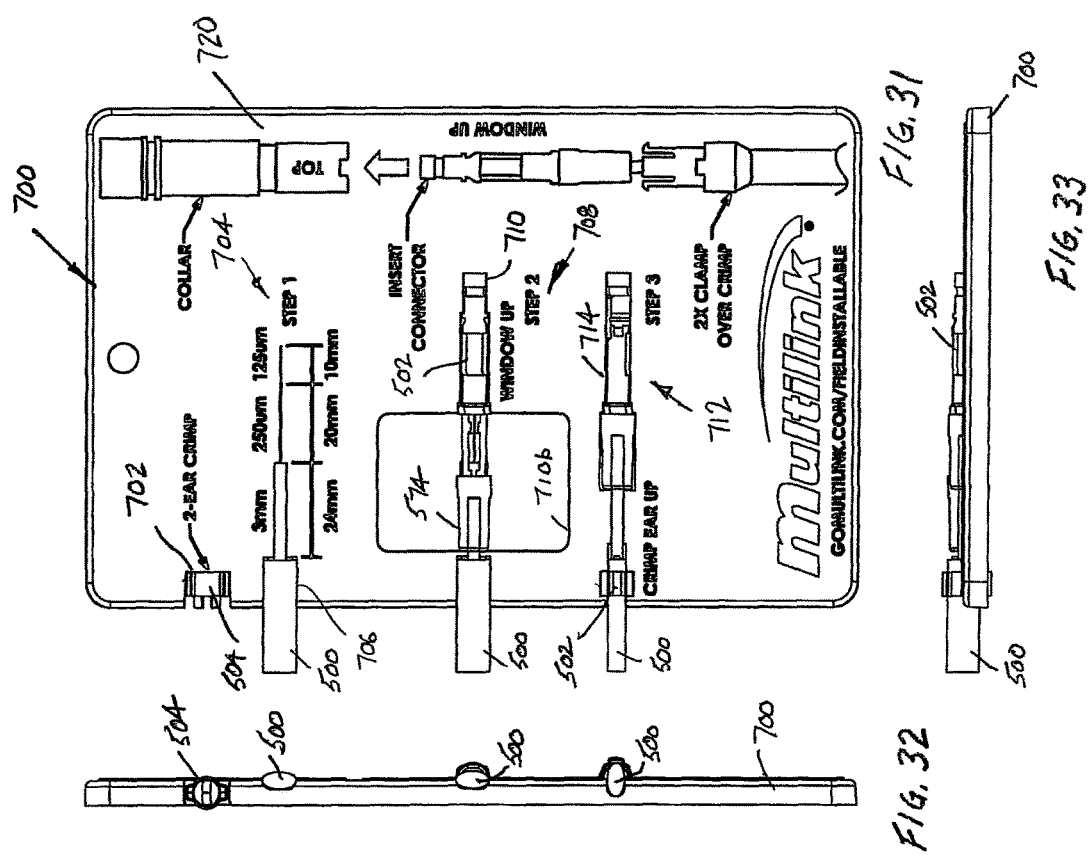

FIBER OPTIC DROP CABLE ASSEMBLY AND PRECONNECTORIZED CABLE ASSEMBLY

This application is a continuation of U.S. Ser. No. 15/944,433 filed on Apr. 3, 2018, now allowed, which claims the priority benefit of U.S. provisional application Ser. No. 62/491,366, filed Apr. 28, 2017, the entire disclosures of which are expressly incorporated herein by reference. In addition, the inventor is also a named inventor of U.S. Ser. No. 15/378,700, filed Dec. 14, 2016, (US2017/0176693, published Jun. 22, 2017), now allowed, the entire disclosure of which is expressly incorporated herein by reference.

BACKGROUND

This invention relates to cable assemblies, and more particularly to termination systems or cable assemblies and pre-connectorized assemblies associated with a fiber-optic network.

Incorporating a connector between drop cables typically requires a number of individual components. It is important that the components properly interconnect with one another in order to provide a desired connection at the end of the cable, for example, that may be easily interfaced with an associated connection, such as a bulkhead or the like.

The connector is oftentimes secured to the terminal end of a cable, sometimes referred to as a drop cable in the fiber optic network industry. Installation of the associated assembly provides for a dust cap, for example, that is tethered to the remainder of the assembly, and is selectively received on and removed from the optical tip located at the terminal end of the cable. It is important that the dust cap be sealingly received over the terminal end of the cable, namely the optical tip. Further, adequate strain relief is required so that the forces can be transmitted to the surrounding cable jacket and not impinge on the data transmitting fiber housed in the cable.

A need exists for an improved arrangement that provides at least one or more of the above-described features, as well as still other features and benefits.

SUMMARY

An improved drop cable is provided in which a metal crimp member is received over the outer surface of the cable jacket, and subsequently mechanically deformed or crimped into a desired configuration that is advantageously incorporated into the clamp assembly associated with the strain relief and pre-connectorized assembly. The metal crimp member may include a single tab or ear formed (crimped) on a periphery thereof, or alternatively may include more than one tab or ear formed on a periphery of the metal crimp member when crimped into place on the jacketed cable.

A two-piece clamp housing grips the tab(s)/ear(s) of the metal crimp member to locate the clamp at the desired axial location on the cable in order to provide desired strain relief.

The crimp member is axially spaced from the connector.

The clamp housing is configured to engage the crimp member and prevent axial movement of the clamp housing relative to the cable, preferably through inclusion of a recess formed in the housing portion dimensioned to receive a portion of the crimp member ear.

The clamp housing is also configured to prevent rotational movement of the clamp housing relative to the cable.

An elastic member, such as a flexible o-ring, is used in one embodiment to retain first and second clamp housing portions together.

In another embodiment, a second crimp member is located adjacent the first crimp member and likewise to form or crimped to mechanically engage a perimeter portion of the cable.

The connector may be a one-piece construction or formed from first and second portions matingly joined together.

A fastener club including first and second legs and an interconnecting bight portion retain the first and second clamp housing portions together.

A gauge provided to assist with assembly of a field installable cable assembly. The gauge includes a first region the receiver crimp member, a second region that demarcates desired length of a fiber, cladding, buffer tube, and/or fiber jacket, and a third region that positions the crimp member relative to a connector on a perimeter of the cable and orients the crimp member for receipt of the clamp housing thereon.

Benefits and advantages of the present disclosure will become more apparent from reading and understanding the following detailed description

BRIEF DESCRIPTION OF THE DRAWINGS

FIG. 1 is a perspective view of a fiber optic connector at an initial stage of assembly.

FIG. 2 is a perspective view of the fiber optic connector at a later stage of assembly.

FIG. 12 is an exploded, perspective view of another fiber optic connector incorporated into a cable assembly.

FIG. 13 shows the collar on the cable assembly of FIG. 12.

FIG. 14 is an exploded, perspective view of another fiber optic connector incorporated into a cable assembly.

FIG. 15 shows the collar on the cable assembly of FIG. 14.

FIG. 16 is an exploded, perspective view of another fiber optic connector incorporated into a cable assembly.

FIG. 17 shows the collar on the cable assembly of FIG. 16.

FIG. 18 is an exploded, perspective view of another fiber optic connector with a two-piece collar incorporated into a cable assembly.

FIG. 19 shows the collar on the cable assembly of FIG. 18.

FIG. 20 is an exploded, perspective view of another fiber optic connector incorporated into a cable assembly.

FIG. 21 shows the collar on the cable assembly of FIG. 20.

FIG. 22 is an exploded, perspective view of another fiber optic connector incorporated into a cable assembly, and particularly an arrangement that is field installable.

FIG. 23 is an enlarged perspective view of a terminal end of the assembled cable assembly of FIG. 22.

FIG. 24 is a perspective view of the embodiment of FIG. 22 particularly illustrating the two part clamp arrangement that cooperates with a crimp having two ears.

FIG. 25 is a perspective view of the embodiment of FIG. 22 during a further stage of assembly.

FIG. 26 is a perspective view of the cable assembly of FIG. 22 with the dust cap removed and tethered to the assembly.

FIG. 27 is a perspective view of the cable assembly of FIG. 22 with the dust cap covering the terminal end of the cable assembly.

FIG. 28 is a perspective view of a gage to facilitate field assembly of, for example, the cable assembly of FIG. 22.

FIG. 29 is a perspective view of the underside of the gage of FIG. 28.

FIG. 30 is a perspective view similar to FIG. 28 with component portions of the cable assembly received in selected portions/stations of the gage.

FIGS. 31-33 are front plan, side, and bottom elevational views of the gage of FIG. 28.

DETAILED DESCRIPTION

Figure 3:
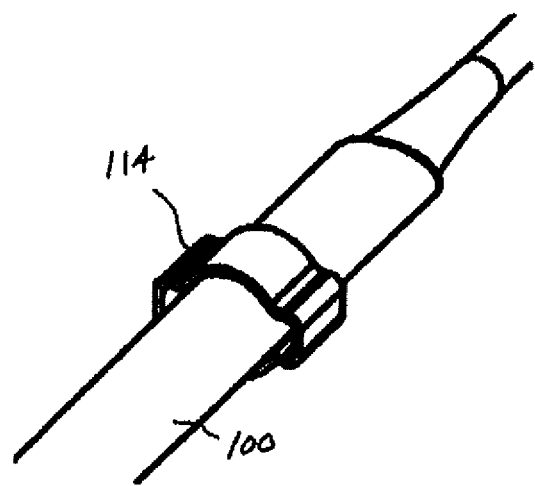
FIG. 3 is a perspective view of a modified crimp member.

FIG. 1 shows a termination system for a fiber optic cable or drop cable assembly 100 with a fiber-optic connector 102 on a terminal end thereof. Fiber-optic connector 102 is typically a pre-manufactured component that positions a terminal end of a bare fiber (e.g., cladding, jacket, cable stripped therefrom) at the end for receipt in a connector or collar that is in turn adapted for engagement with a receptacle, housing, etc. (not shown). The termination system includes a band or crimp member 104 that is dimensioned for and circumferentially received around a portion of the fiber optic cable 100 at a preselected location axially spaced from the connector 102. The crimp member 104 (typically a metal crimp member) is shown in an undeformed or uncrimped state in FIG. 1, and is subsequently mechanically deformed or crimped by forming at least one radially outward extending ear 106 and reducing the cross-section of the crimp member into tight mechanical gripping engagement with the external surface of the fiber optic cable 100 as shown in FIG. 2.

Figure 4:
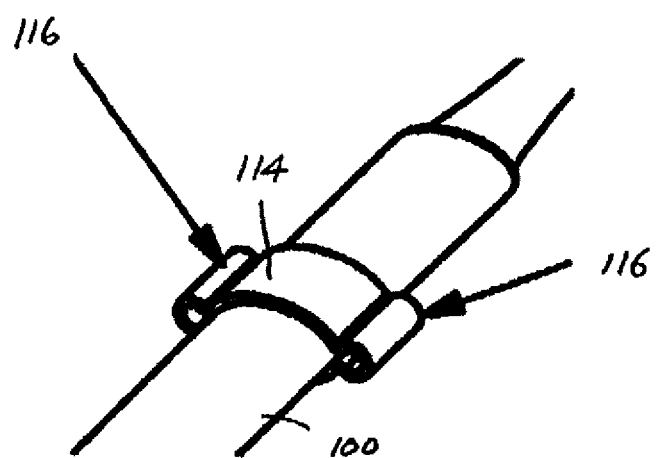
FIG. 4 is a perspective view of the modified crimp member of FIG. 3 at a later stage of assembly.
Figure 5:
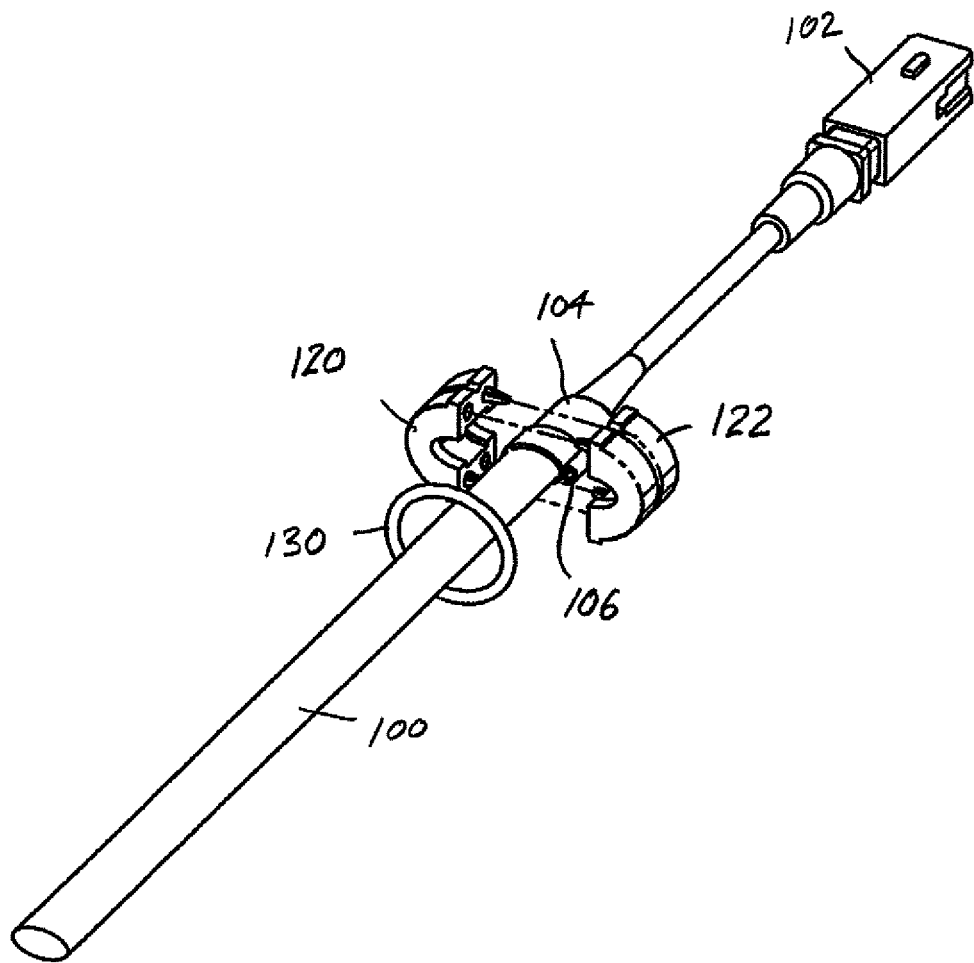
FIG. 5 is a perspective view of the fiber optic connector receiving a two-part strain relief clamp assembly and a retaining O ring.
Figure 6:
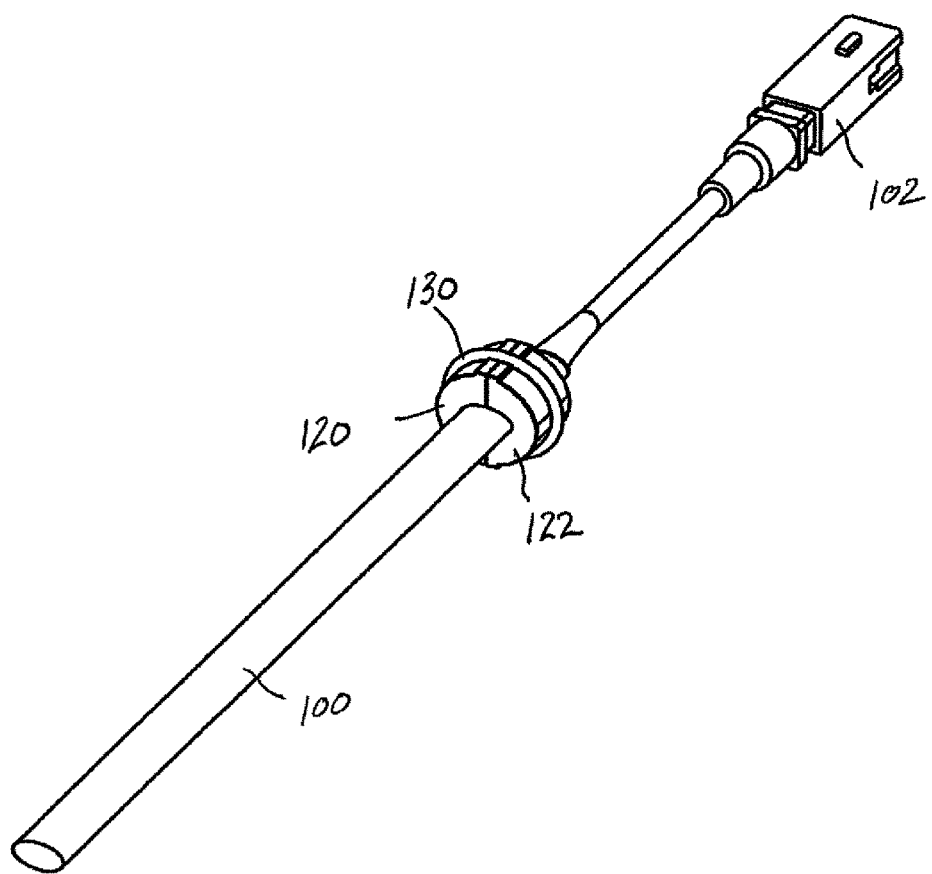
FIG. 6 is a perspective view of the fiber optic connector of FIG. 2 with the assembled strain relief.

In the crimped arrangement of FIG. 2, the crimp band 104 and particularly the extending shoulder or ear 106 is used for locating and mounting additional components of the termination system for the cable assembly as will become more apparent below. The crimp ear 106 is dimensioned to extend outwardly (e.g., radially outward) from the remainder of the crimp member 104, and likewise extends outwardly from the outer surface of the cable 100. Alternatively, the crimp member/band 114 shown in FIGS. 3 and 4 includes a pair of outwardly extending shoulders or ears 116 that serve the same purpose as the individual ear 106 of FIG. 2. For example, as illustrated in FIGS. 5-6, the termination system further includes a strain relief arrangement or clamp housing 118 that is mounted over the crimped band 104 (or crimped band 114). More specifically, the clamp housing 118 includes first and second cooperating clamp housing portions 120, 122. The two split clamp housing portions 120, 122 are shown as clamp member halves that are preferably identical, mirror images of one another to facilitate manufacture, inventory, and use, although as will become more apparent below, the clamp housing portions 120, 122 may be dissimilar. In the embodiment of FIGS. 5-6, each clamp housing portion 120, 122 has a generally U-shaped conformation where the U-shape conforms over the crimped band 104 and the cross-sectional configuration of the fiber-optic cable 100. That is, the inner, annular surface portions of each clamp housing portion includes a recess configured to receive the crimp member therein, and particularly configured to closely receive the crimp member ear(s) to prevent relative movement (both rotational and axial) between the assembled clamp housing portion and the crimp member that is mechanically fixed to the perimeter of the cable 100. As is also evident in FIGS. 1-6, the cable 100 in these arrangements has a non-round cross-sectional shape or conformation that further limits rotational movement of the clamp housing portions 120, 122 relative to the cable. Preferably, the inner surface of one or both of the clamp members form a recess or cavity(ies) that receive the ear(s) 106 (116) of the crimp member/band 104 (114) so that when the clamp housing portions are held together, either by themselves or with the additional use of a retaining member 130 such as elastic member or o-ring (see FIG. 5-6), the clamp housing assembly is secured against axial movement relative to the crimped band and likewise relative to the fiber-optic cable 100. That is, the conformation of the interior cavity of the clamp member(s) 120, 122 conforms around the outwardly extending ear 106 of the crimp member/band 104 to limit rotational and axial movement of the clamp housing 118. Thus, the crimp member/band 104 tightly grips the outer surface of the cable assembly 100 and axially and circumferentially fixes the clamp arrangement 118 as a result of the mechanical interlock between the recess(es) formed in the clamp member(s) and the ear(s) 106/116 of the band.

Figure 7:
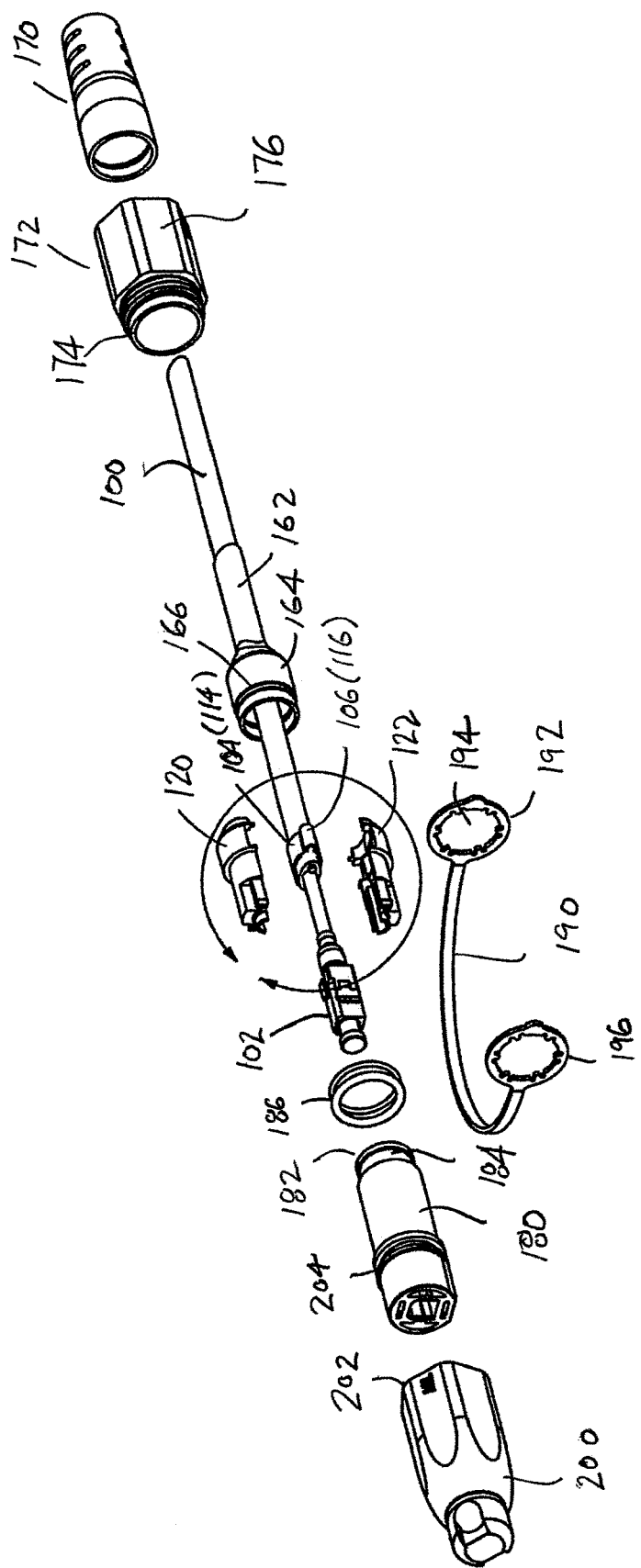
FIG. 7 is an exploded, perspective view of the fiber optic connector incorporated into a cable assembly.
Figure 8:
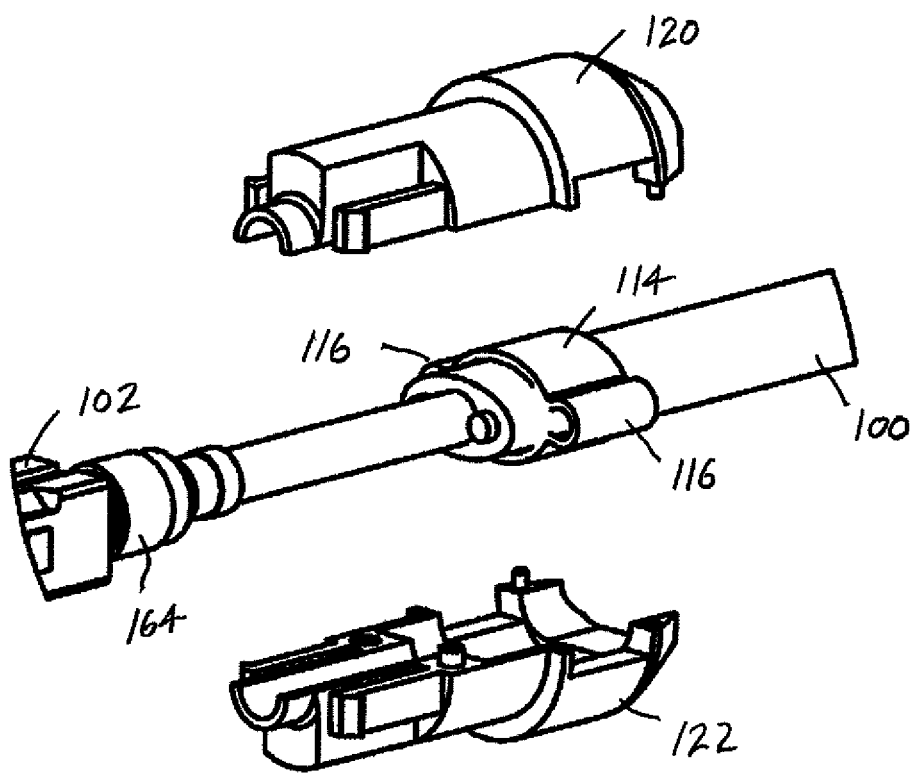
FIG. 8 is an enlarged perspective view of the two-part strain relief clamp assembly received over the modified crimp member of FIG. 5.

As more particularly illustrated in FIGS. 7 and 8, the fiber optic cable 100 is incorporated into the termination system or connector assembly 150. The termination system/connector assembly 150 further includes, for example, a sealing tube 160 received over the cable 100 that includes a reduced diameter portion 162 and an enlarged diameter portion 164 preferably located at one end thereof. The large diameter portion 164 is adapted to cover a first or proximal end of the clamp housing assembly 120, 122 once it has been assembled on the crimp member/band 104. A seal ring 166 is received over an external surface of the enlarged diameter portion 164 of the tube 160.

A boot/sleeve 170 is also received over the cable 100 and is axially located adjacent coupling nut 172. The coupling nut 172 has a first or distal end that preferably includes an external thread 174, and includes tool flats 176 at the other end that allow a tool such as a wrench (not shown) to engage the coupling nut and facilitate make-up of the cable connector assembly 150. The thread 174 of the coupling nut 172 cooperates with internal threads (not shown) formed on an inner diameter portion of a collar or adapter 180, specifically at a first or proximal end 182 thereof. An external annular surface 184 of the collar 180 has a reduced diameter that receives one or more seal rings 186 at the first end 182 of the collar. The seal rings 186 prevent intrusion of moisture between the collar 180 and the coupling 172 when the components are threaded together.

Figure 9:
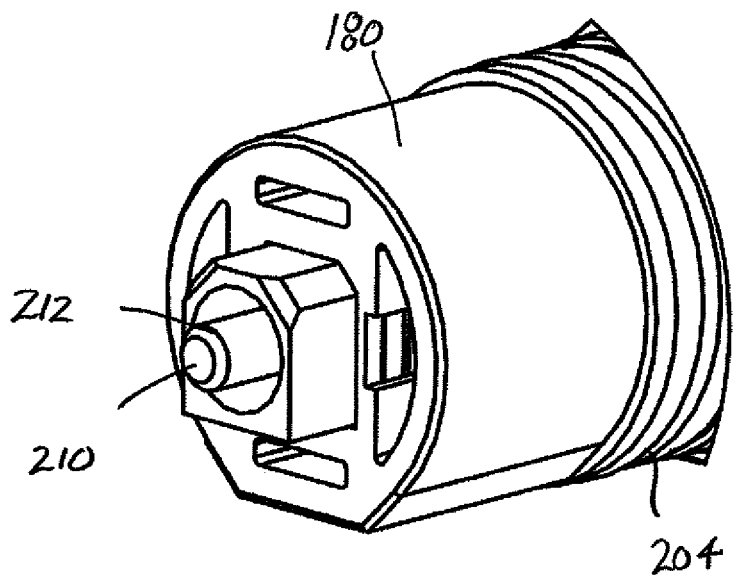
FIG. 9 is an enlarged perspective view of the terminal end of the polished end of the fiber of the cable assembly.
Figure 10:
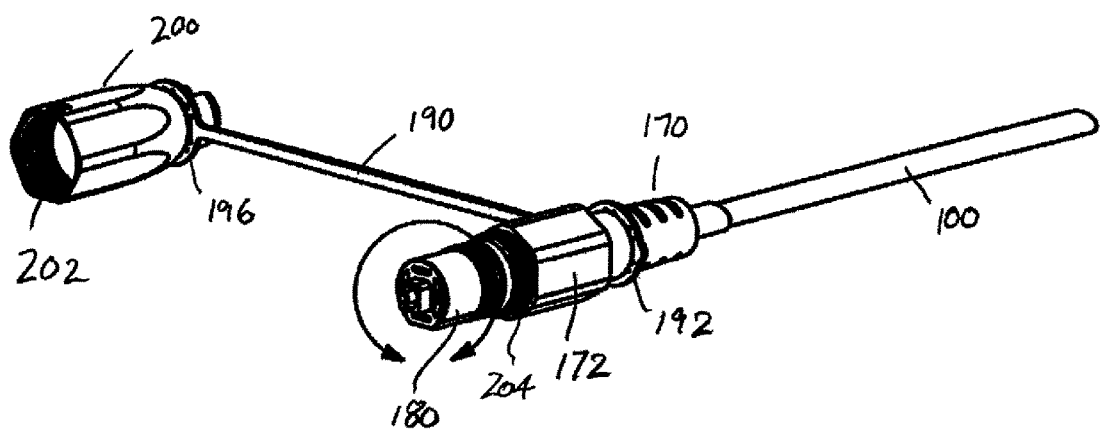
FIG. 10 is a perspective view of the assembled fiber optic cable assembly with the dust cap removed to expose the terminal end of the cable assembly.
Figure 11:
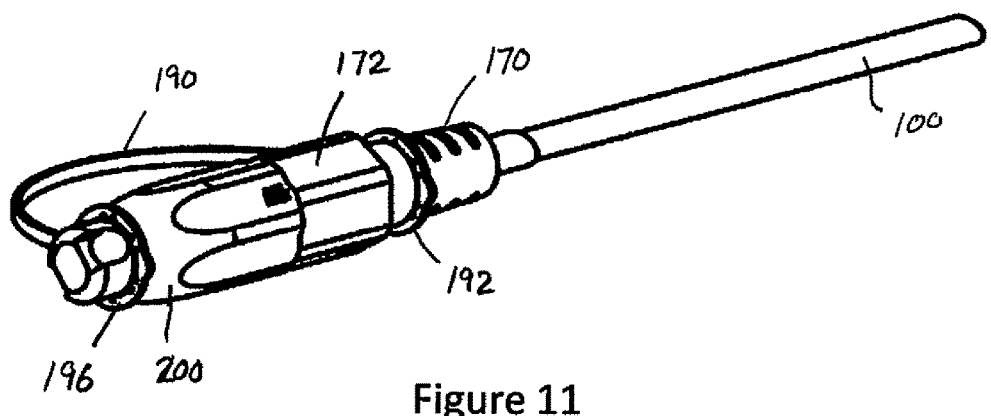
FIG. 11 is a perspective view similar to FIG. 10 with the dust cap installed on the terminal end of the cable assembly to protect the polished end of the fiber.

Strap or tether 190 includes a first attachment or ring portion 192 that is positioned over the boot/sleeve 170 and has an inner opening 194 less than an outer dimension of the coupling nut 172 (see FIGS. 10-11). A second ring portion 196 is mounted or secured to dust cover 200. Further, the dust cover 200 preferably includes an internally threaded region at first end 202 that cooperates with external threads 204 on the collar 180. Consequently, when the dust cover 200 is removed from engagement with the collar 180, and thus exposing a terminal end of the optical fiber 210 encased within buffer tube 212 (FIG. 9) of the fiber optic cable 100 that extends slightly axially outward from the remainder of the collar, the strap 190 retains the dust cover for ease of re-mounting on the exposed end of the fiber optic cable 100 if the cable is disconnected (FIGS. 10-11).

FIGS. 12 and 13 illustrate slight modifications in a second version of the termination system/cable connector assembly. Like reference numerals in this embodiment (and likewise in to be described additional embodiments) will be used to refer to like components, while new reference numerals will refer to the specific new features that vary from the embodiment of FIGS. 1-11. It will also be appreciated that modifications made in one of the alternative embodiments described below may be used in combination with one or more of the modifications made in others of the alternative embodiments, or with components/features described in connection with the previously described embodiment. Particularly, in FIG. 12, the two-piece clamp housing assembly is slightly modified so that one of the first and second clamp housing portions 220, 222 is modified in a manner that completely encompasses or surrounds the cable 100 so that an opening 224 (for example at one end) formed in the one component (shown here as clamp housing portion 222) completely encircles the outer surface of the cable 100 and the clamp housing portion must be slid into position over the cable. The other clamp housing portion still cooperates to enclose the crimp member(s) 104 therein and axially locate the connector assembly 150 on the cable 100. The clamp housing portions 220, 222 together define a recess that closely conforms to the radially extending ear 106 (or pair of ears) of the crimp member 104 to prevent relative movement between the clamp housing portions and the crimp member that is mechanically deformed into gripping engagement with the outer perimeter of the cable 100. Further, the collar 130 is modified at a distal end to include a pair of angled sidecuts or recesses 230.

In FIGS. 14-15, first and second crimp members 240, 242 are provided on the cable 100, and suitably mechanically deformed or crimped on either one or diametrically opposite sides in a manner akin to that previously described in connection with FIG. 2 or FIG. 4, Suitable modification is made to at least one of the two-piece clamp housing portions 120, 122 for engagement with the ears 106 of the first and second clamp bands 240, 242. Collar 250 is also a modification over the previously illustrated one-piece collar of the earlier arrangement such that the collar in FIG. 14 is a two-piece assembly comprising a first component 252 and a second component 254. The collar component 252 is modified at a first or proximal end 256 to completely encase (i.e., circumferentially enclose) those portions of the connector 102 and clamp portions 120, 122 received therein, and the second collar component 254 is suitably manufactured to complete the circumferential encapsulation around the connector 102.

FIGS. 16-17 illustrate an alternative, hinged clamp housing 270 that includes a first portion 272 hinged to a second portion 272 along a hinge 274. The hinge 274 also serves to join the first and second clamp housing portions 270, 272 together for ease of handling, although such an arrangement does require sliding the hinge 274 over the external surface of the cable 100 before the crimp member 104 is positioned in place. Here, the hinge 274 of the clamp housing portions 270, 272 is oriented in perpendicular relation relative to the longitudinal axis of the cable, although as will become apparent below, a hinge can be oriented parallel to the longitudinal axis if so desired.

In FIGS. 18-19, the two-piece clamp housing portions 280, 282 are modified to have a greater axial length 284 or a different outer configuration so that the clamp housing portions engage (interfit or are keyed to) the collar 180. As a result, the modified clamp housing portions 280, 282 engage the front collar 180 and prevent relative rotation or cable twist, as well as to limit separation of the collar from the remainder of the assembly 150. Further, the collar 180 is defined by two pieces 286, 288 each having respective internal and external thread portions 290, 292, for example, that allow the two pieces to be threaded together (axially separated components that are subsequently axially joined by threading the components together). A seal ring 294 is also provided to limit potential moisture ingress between the collar pieces 286, 288.

In FIGS. 20-21, a modified one piece collar 300 includes one or more external grooves 302 extending axially from the first, distal end to externally threaded region 204 of the collar. This limits rotation of the collar 300 relative to the female end of an adjacent connector assembly (not shown).

FIGS. 22-27 illustrate a termination system/connector assembly that is advantageously field installable. Particularly, many of the components are structurally and/or functionally identical or similar to one or more of the embodiments described above (for example, compare FIG. 7 and FIG. 22). Therefore, the following description relating to FIGS. 22-27 focuses on the differences associated with the field installable connector and other features that are identical or substantially similar are not described herein for purposes of brevity. The field installable assembly includes a fiber optic cable 500 and a standard connector 502 that terminates an optical fiber in a manner well known in the art. A crimp member 504 includes at least one ear 506 or a pair of ears when the crimp member is mechanically deformed into gripping engagement with an outer surface of the cable. First and second clamp housing portions 520, 522 mate together and are received over the crimp member 504, operatively engaging one or more ears 506 thereof, to prevent movement of the clamp housing portion relative to the crimp member and thus relative to the cable 500 since the crimp member is fixed to the outer surface of the cable. A tube such as a heat shrinkable, sealing tube 560 is positioned over the cable 500 and ultimately received over the clamp housing portions and connector 502, as well as other components of the assembly. For example, the tube 560 includes a reduced diameter portion 562 and an enlarged diameter portion 564 adapted to cover at least one end of the clamp assembly 520. Seal ring 566 is received over an external surface of the enlarged diameter portion 564.

A boot/sleeve 570 is received over the cable 500 and located axially adjacent coupling nut 572. The coupling nut 572 has a first or distal end that includes an external thread 574, and tool flats 576 on an external surface thereof that receive a tool such as a wrench to engage the coupling nut and facilitate makeup of the assembly. Threads 574 of the coupling nut 572 cooperate with internal threads (not shown) formed on an inner diameter portion of a collar or adapter 580, specifically at a first or proximal end 582. An external annular surface 584 of the collar 580 has a reduced diameter that receives at least one seal or o-ring 586 at the first end 582 of the collar. The seal rings 586 prevent intrusion of moisture between the collar 580 and the coupling 572 when the components are threaded together.

Strap or tether 590 includes ring portions 592, 594 to connect the dust cover 600 to the coupling nut 572 (FIGS. 22, 26, and 27). The dust cover 600 includes an internally threaded region at a first end 602 (FIG. 26) that cooperates with external threads 574 on the coupling nut 572.

When the clamp housing is inserted into the first end 582 of the collar 580, wedge or ramp portions 620, 622 provided on the outer surfaces of the respective clamp housing portions 520, 522 cooperate with a clip 630 to retain the collar and complete makeup with the remainder of the assembly. Specifically, clip 630 (FIGS. 22 and 25) is generally U-shaped and includes first and second legs 632, 634 interconnected by a bight region 636 to form a spring clip. The legs 632, 634 of the spring clip 630 are received in an external groove 640 on the collar 580. When the clamp housing with the connector 502 received therein is inserted into the collar 580, wedge portions 620, 622 expand the legs 632, 634 against the spring bias of the legs and urge the legs outwardly. External grooves 642 644 (located axially behind the wedge portions) receive the spring clip legs where the natural resilience of the spring clip legs urge the legs radially inwardly from the larger dimension experienced traveling over the wed portions and then are received in the external grooves and thereby secure the clamp housing to the collar.

FIGS. 28-33 illustrate a gage 700 that facilitates makeup of the field installable assembly of FIGS. 22-27. Particularly, a first recess 702 is dimensioned to receive a crimp member 504 and can be used to store the crimp member on the gage 700. In a first station 704 (Step 1), stepped recess 706 is dimensioned to receive the terminal end of the fiber-optic cable 500. Suitable dimensioning is printed on the face of the gage 700 to instruct the user with regard to removal of the components such as cladding, buffer tube, etc. from the cable 500 and expose a predetermined length of optical fiber. At a second station 708 (Step 2) on the gage 700, stepped recess 710 is dimensioned to receive the connector 502 and likewise align the previously exposed optical fiber (at the terminal end of the cable 500) from the first station 704 (Step 1) for precise, axial insertion into the connector 502. The terminated end of the cable 500 is joined to the connector 502 in a conventional manner. In a third station 712 provided on the gage 700, a multi-step recess 714 is configured to receive the terminal end of the cable 500 joined to the connector 502 from the second station 708 so that the crimp member can only be received in a certain, prescribed orientation, i.e., with the crimp region thereof facing upwardly, to allow the user to form the ear 506 on the crimp member 504. Once the ear 506 of the crimp member 504 is mechanically deformed into gripping engagement with the perimeter surface of the cable 500, the connector and terminal end of the optical fiber are joined together at the desired, precise locations relative to one another. Further, enlarged portion 710b of the recess allows the user to manipulate the boot/sleeve 574 for axial receipt over the first or proximal end of the connector 502 (FIG. 30). Although not a separate station on the gauge 700, further instructions 720 are provided on the gage to illustrate to the user how to complete field makeup of the assembly (e.g., illustrations showing receipt of the clamp housing portions 520, 522 over the ear of the crimp member, insertion of the connector into the collar 580.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept, or if they include equivalent structural elements with insubstantial differences.

What is claimed is:

1. A termination system for an associated fiber optic cable assembly having an associated, elongated cable that extends along a longitudinal, first axis, and includes an associated optical fiber therein, the termination system comprising
   a connector configured for receipt around the associated cable and a terminal end of the associated optical fiber, wherein the connector includes first and second connector portions each having a central passage therethrough configured to receive the associated cable, and wherein the first and second connector portions include mating joinder elements for joining the connector portions with a seal member received therebetween;
   a crimp member configured for fixed receipt on an external surface of the associated cable and having at least a first ear extending outwardly from the associated cable; and
   a clamp housing including first and second clamp housing portions at least partially received around the crimp member, and together configured to circumferentially surround the associated cable, at least the first clamp housing portion configured to mechanically engage the ear of the crimp member and prevent relative movement therebetween.

2. The termination system of claim 1 wherein the crimp member is axially spaced from the connector.

3. The termination system of claim 1 wherein the crimp member includes a second ear extending outwardly from the associated cable and at least the first clamp housing is configured to mechanically engage the second ear of the crimp member and prevent relative movement therebetween.

4. The termination system of claim 1 wherein the at least first clamp housing portion is configured to prevent axial movement of the clamp housing relative to the associated cable.

5. The termination system of claim 4 wherein the at least first clamp housing portion is configured to prevent rotational movement of the clamp housing relative to the associated cable.

6. The termination system of claim 1 wherein the at least first clamp housing portion is configured to prevent rotational movement of the clamp housing relative to the associated cable.

7. The termination system of claim 1 further comprising an elastic member for retaining the first and second clamp housing portions together.

8. The termination system of claim 1 wherein the first and second clamp housing portions are hinged together along a hinge region that is configured for orientation oriented (i) parallel to or (ii) perpendicular to an axis of the associated cable, and allows the clamp housing portions to join together over the crimp member and about a perimeter region of the associated cable.

9. The termination system of claim 1 further comprising a second crimp member located adjacent the first crimp member.

10. The termination system of claim 1 wherein the connector includes first and second portions that are matingly joined together.

11. The termination system of claim 1 further comprising a clip having first and second legs and a bight portion interconnecting the legs, the clip legs retaining the first and second clamp housing portions together.

12. The termination system of claim 1 wherein the crimp member is configured to extend about an entire perimeter region of the associated cable that compresses into a perimeter of the associated cable and reduces a cross-section of the associated cable beneath the crimp member and fixes the crimp member from movement relative to the associated cable, the first ear extending radially outward from an outer surface of the associated cable.

13. The termination system of claim 12 wherein the crimp member includes a second ear extending radially outwardly from the associated cable at a location approximately diametrically opposite from the first ear.

14. The termination system of claim 1 wherein the first and second clamp housing portions each include a recess formed therein dimensioned to receive a portion of the first ear therein to limit relative axial movement between the clamp housing and the crimp member.

15. The termination system of claim 1 wherein the first clamp housing portion includes a complete annulus for receipt about an entire perimeter of the associated cable, an opening formed in the annulus dimensioned for sliding receipt over the associated cable.

16. The termination system of claim 1 wherein the connector includes first and second connector portions that together are configured to encompass an entire perimeter portion of the associated cable.

17. A termination system for an associated fiber optic cable assembly having an associated, elongated cable that extends along a longitudinal, first axis, and includes an associated optical fiber therein, the termination system comprising a connector configured for receipt around the associated cable and a terminal end of the associated optical fiber, a groove in the connector that receives first and second legs of a U-shaped clip joined by a bight portion and configured for insertion into the connector groove in a direction perpendicular to an axis of the associated cable;

a crimp member configured for fixed receipt on an external surface of the associated cable and having at least a first ear extending outwardly from the associated cable; and a clamp housing including first and second clamp housing portions at least partially received around the crimp member, and together configured to circumferentially surround the associated cable, at least the first clamp housing portion configured to mechanically engage the ear of the crimp member and prevent relative movement therebetween.

18. The termination system of claim 17 wherein the first and second clamp housing portions include wedge-shaped ramps along external surface regions thereof that cooperate with the first and second legs of the clip to limit relative axial movement between the connector and the clamp housing portions.

* * * * *